US007261076B2

(12) United States Patent
Hoevermann

(10) Patent No.: US 7,261,076 B2
(45) Date of Patent: Aug. 28, 2007

(54) METHOD AND CONTROL SYSTEM FOR POSITIONING A CRANKSHAFT OF AN INTERNAL COMBUSTION ENGINE

(75) Inventor: Markus Hoevermann, Leeder (DE)

(73) Assignee: Temic Automotive Electric Motors GmbH, Berlin (DE)

( * ) Notice: Subject to any disclaimer, the term of this patent is extended or adjusted under 35 U.S.C. 154(b) by 294 days.

(21) Appl. No.: 11/107,406

(22) Filed: Apr. 14, 2005

(65) Prior Publication Data

US 2005/0229889 A1 Oct. 20, 2005

(30) Foreign Application Priority Data

Apr. 15, 2004 (EP) .................................. 04009028

(51) Int. Cl.
*F02N 11/08* (2006.01)
*F02N 17/00* (2006.01)
*B60K 6/00* (2006.01)

(52) U.S. Cl. ............................ 123/179.4; 123/179.28; 290/40 A; 180/165.4

(58) Field of Classification Search .. 123/179.3–179.5, 123/179.28; 318/715, 445–446; 180/60, 180/65.2–65.4; 290/40 R, 40 A
See application file for complete search history.

(56) References Cited

U.S. PATENT DOCUMENTS

| | | | | |
|---|---|---|---|---|
| 5,323,743 | A * | 6/1994 | Kristiansson | 123/179.3 |
| 6,202,614 | B1 * | 3/2001 | Grob et al. | 123/179.3 |
| 6,218,799 | B1 * | 4/2001 | Hori | 318/446 |
| 6,453,863 | B1 * | 9/2002 | Pels et al. | 123/179.3 |
| 6,453,864 | B1 * | 9/2002 | Downs et al. | 123/179.3 |
| 6,499,342 | B1 * | 12/2002 | Gonzales, Jr. | 73/117.3 |
| 6,674,261 | B2 * | 1/2004 | Takahashi et al. | 318/721 |
| 6,681,173 | B2 * | 1/2004 | Turner et al. | 701/113 |
| 6,778,899 | B2 * | 8/2004 | Weimer et al. | 123/179.2 |
| 6,807,934 | B2 * | 10/2004 | Kataoka et al. | 123/179.4 |
| 6,834,632 | B2 * | 12/2004 | Kataoka et al. | 123/179.4 |

(Continued)

FOREIGN PATENT DOCUMENTS

DE 198 17 497 10/1999

(Continued)

*Primary Examiner*—Carl S. Miller
*Assistant Examiner*—Arnold Castro
(74) *Attorney, Agent, or Firm*—W. F. Fasse; W. G. Fasse

(57) ABSTRACT

The invention relates to a method and a control system for driving an electric motor (4) coupled with a crankshaft (2) of an internal combustion engine, in order to position the crankshaft (2) at a starting angle, wherein the control system comprises: a detection device (7) for receiving and/or determining a position angle and/or the rotational speed of the crankshaft (2), and a control unit (5) which is capable of driving the electric motor (4) in a closed loop control mode dependent on the rotational speed of the crankshaft and of positioning the crankshaft (2) at said starting angle after the internal combustion engine (1) is stopped, so that, in the case of a subsequent start, the internal combustion engine (1) is started from this starting angle, wherein the control unit (5) is designed so as to drive the electric motor (4) according to an open loop control mode, below a prespecified rotational speed limit independently of the rotational speed in an open loop control, so that the crankshaft (2) is set to the starting angle.

15 Claims, 2 Drawing Sheets

U.S. PATENT DOCUMENTS

| | | | | |
|---|---|---|---|---|
| 6,938,606 | B2 * | 9/2005 | Chung et al. | 123/198 DB |
| 7,011,063 | B2 * | 3/2006 | Condemine et al. | 123/179.4 |
| 7,024,859 | B2 * | 4/2006 | Jayabalan et al. | 60/716 |
| 2002/0093202 | A1 | 7/2002 | Downs et al. | |
| 2003/0030406 | A1 | 2/2003 | Takahashi et al. | |

FOREIGN PATENT DOCUMENTS

| | | |
|---|---|---|
| DE | 100 30 001 | 7/2001 |
| EP | 1 136 696 | 9/2001 |

* cited by examiner

METHOD AND CONTROL SYSTEM FOR POSITIONING A CRANKSHAFT OF AN INTERNAL COMBUSTION ENGINE

PRIORITY CLAIM

The priority of EP 04 009 028.4 filed Apr. 15, 2004 is claimed and the disclosure thereof is incorporated herein by reference.

FIELD OF THE INVENTION

The invention relates to a method and a control system for positioning a crankshaft of an internal combustion engine.

BACKGROUND TO THE INVENTION

In order to start up internal combustion engines, it is necessary to use a starter, e.g. in the form of an electric motor which is directly or indirectly coupled with the crankshaft of the internal combustion engine. The crankshaft is then accelerated by the starter until it reaches the engine speed required to start the internal combustion engine.

The starting torque which the starter initially needs to generate varies according to the position angle of the crankshaft. Particularly when a cylinder is in a compression stroke at that point, a high starting torque is required which has a negative impact on the starting behaviour of the internal combustion engine.

In order to improve the starting behaviour of the internal combustion engine, it is known from publication DE 198 17 497 A1 of the applicant that the crankshaft of the internal combustion engine be brought to a specific starting angle, from which the starting procedure is then carried out. In this way, an unsuitable position of the crankshaft at the beginning of the starting procedure can be avoided, and the starting time of the internal combustion engine or the initial torque to be summoned by the starter during the starting procedure can be reduced. The crankshaft can be positioned after the internal combustion engine has been stopped, or before the internal combustion engine is started.

Normally, electric starting motors are used to start internal combustion engines, which are driven using field-oriented regulation. These electric motors are asynchronous or synchronous motors in particular. Such electric motors are operated using a motor control which requires the rotational speed of the rotor or crankshaft as an input quantity for field-oriented regulation.

For this purpose, the crankshaft is equipped with a position sensor, for example, which determines the position angle of the crankshaft and uses it to calculate the rotational speed of the crankshaft. However, the degree of precision of the calculated rotational speed depends on how precisely the position angle has been determined by the position sensor. Rotational speed sensors are also frequently provided in order to detect the rotational speed directly.

In both cases, the calculated rotational speed is relatively imprecise. Particularly when the crankshaft rotational speed is low, this results in the relative error becoming very large, and field-oriented regulation in order to drive the electric motor is no longer possible. The crankshaft can no longer be actively positioned in a reliable manner using the electric motor, particularly just before the crankshaft comes to a standstill, when the combustion engine is stopped.

A possible solution to this problem would be to use more precise sensors to detect the position angle and/or rotational speed. However, it is desirable to position the crankshaft at a starting angle while maintaining the components of the engine system used to date.

The object of the invention is to provide an improved method and an improved control system for positioning the crankshaft of an internal combustion engine.

SUMMARY OF THE INVENTION

An initial aspect of the invention relates to a method for positioning a crankshaft of an internal combustion engine at a starting angle using an electric motor coupled with the crankshaft. The electric motor can be driven according to a closed loop control mode with field-oriented regulation dependent on the rotational speed of the crankshaft. The crankshaft is set to the starting angle after the internal combustion engine is stopped, in order to start the internal combustion angle from this starting angle when the latter is subsequently started, wherein the electric motor is driven below a rotational speed limit in an open loop control mode independently of the rotational speed in an open loop control in order to set the starting angle.

A further aspect relates to a control system for driving an electric motor coupled with a crankshaft of an internal combustion engine, in order to position the crankshaft at a desired starting angle. A detection device for receiving or determining a position angle and/or the rotational speed of the crankshaft is provided for this purpose, together with a control unit which is capable of driving the electric motor in a closed loop control mode with field-oriented regulation dependent on the rotational speed of the crankshaft, and of positioning said crankshaft at the starting angle after the internal combustion engine is stopped, so that in the case of a subsequent start, the internal combustion engine is started from this starting angle. The control unit is structured in such a way as to drive the electric motor according to an open loop control mode below a prespecified rotational speed limit independently of the rotational speed in an open loop control, so that the crankshaft is set to the starting angle.

Further embodiments of the invention are described in the relevant dependant claims.

A switch to an open loop control is proposed when driving the electric motor to position the crankshaft at the starting angle, so that the electric motor is driven independently of the rotational speed. This is advantageous, since with standard engine systems, the detection and evaluation of the rotational speed is usually too imprecise to be able to operate the electric motor with field-oriented regulation when the rotational speed is low. Particularly with very low rotational speeds, such as those which occur when the crankshaft of the internal combustion engine runs down shortly before the crankshaft comes to a standstill, the degree of imprecision for determining the rotational speed may result in a very large relative deviation, so that field-oriented motor regulation is no longer possible without significant running problems occurring while the electric motor is in operation.

The use of the open loop control mode for the electric motor also has the advantage that the electric motor is operated independently of the rotational speed detected for the crankshaft. This is made possible by operating the electric motor with a specific drive frequency and with a specific voltage or current in order to reach a prespecified torque. The electric motor can thus be operated in such a way as to allow the position angle to be set. The current or voltage and frequency are selected so as to ensure that the torque that is reached is sufficient to prevent the internal combustion engine from reversing. This has the advantage of also enabling position/rotational speed sensors which do not recognize left/right rotation to determine the precise position of the internal combustion engine.

Further characteristics of the invention can be taken from the objects and methods revealed, or can be seen by persons having the ordinary skill in the art from the following detailed description of the embodiments and the appended drawings.

DESCRIPTION OF THE DRAWINGS

Embodiments of the invention will now be described by way of examples and with reference to the attached drawing, in which.

DESCRIPTION OF THE PREFERRED EMBODIMENTS

Figure 1:
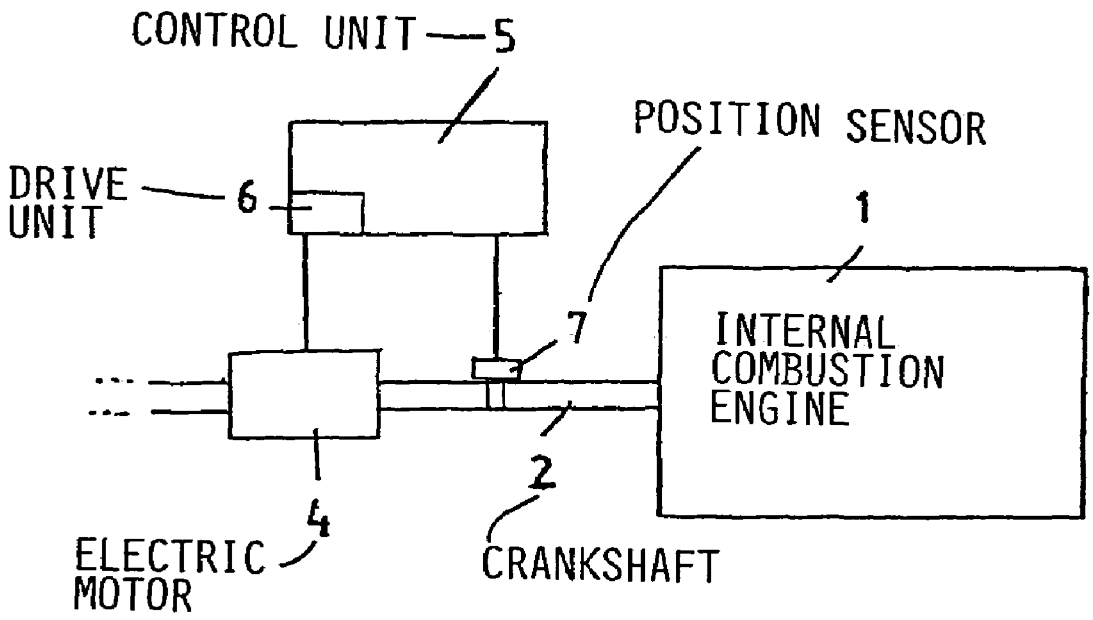
FIG. 1 shows a diagrammatic view of a starter system for an internal combustion engine.

FIG. 1 shows an engine system, e.g. for a motor vehicle. It comprises e.g. a four-cylinder internal combustion engine 1 working in a four-stroke cycle, which transfers the torques to further components (not shown) of a drive system for the vehicle and onto the drive wheels of the motor vehicle via a crankshaft 2.

In this exemplary embodiment, an electric motor 4, which acts as a starter/generator, is positioned directly on the crankshaft 2. The electric motor 4 comprises a rotor (not shown) which is firmly connected to the crankshaft 2 and a stator (not shown) which rests e.g. on the housing of the internal combustion engine 1. In the exemplary embodiment shown, the electric motor 4 is an asynchronous motor 4, but it can also be a synchronous motor or similar.

An electric motor 4 of this type has a high torque for operating as a starter. In other embodiments of the invention (not shown), the electric motor 4 is coupled with the crankshaft 2 via a transmission gear, if necessary via single-track gears which are connected in series. The electric motor 4 is designed in such a way that it can reach the necessary torque in the direction of rotation of the internal combustion engine to set the required crankshaft angle position, as well as achieve the starting power required when starting to directly drive the crankshaft 2 to the necessary starting rotational speed.

In the exemplary embodiment according to FIG. 1, the electric motor is driven by a control unit 5. The control unit 5 comprises a drive unit 6 in order to drive the electric motor 4 using drive signals, particularly with the aid of PWM signals (pulse width modulation signals). In general, the drive signals are generated dependent on the current engine speed, the desired set rotational speed and/or of the position angle of the rotor of the electric motor 4. The control unit 5 also controls the procedure for setting the starting angle, as well as the starting procedure.

The control unit 5 receives the current position angle of the crankshaft from a position sensor 7, which is attached to the crankshaft in the exemplary embodiment shown. According to a further embodiment of the invention, the position sensor can also be integrated in the electric motor 4, and can be e.g. a Hall effect torque-synchro sensor, in order to measure the angle of the rotor. Due to the direct coupling of the rotor with the crankshaft 2, the rotor angle measured corresponds to the position angle.

The starting procedure for the internal combustion engine 1 is prepared in a particular way. After the engine operation has ended, e.g. when, or just after, the ignition of the motor vehicle is switched off, the control unit 5 drives the electric motor 4 via the drive unit 6 in such a way that the crankshaft 2 is brought into a crankshaft angle position suitable for the subsequent start: the starting angle. Here, the electric motor 4 controls the crankshaft 2 of the internal combustion engine 1 which is in the process of running down, in order to set the desired starting angle.

The position sensor 7 is used primarily to detect the position angle. However, it is also used to detect the rotational speed for a wide range of functions within the engine system, and in particular to control the injection of the internal combustion engine. The position sensors which are commonly used, however, generally only have a degree of precision sufficient for the standard functions. A signal edge of the position sensor 7 can indicate that the starting angle has been reached. In particular, a CAN signal can indicate that the starting angle has been reached.

The electric motor 4 is usually operated in a closed loop control mode, i.e. the drive signals are generated by the drive unit 6 dependent on e.g. the rotational speed and the desired set rotational speed. However, if the rotational speed of the crankshaft 2 or the current position angle are only detected with a low degree of precision, this leads to significant relative errors, above all when the rotational speed of the crankshaft 2 is low, which prevent the electric motor 4 from being operated in a precise manner in a closed loop control mode. Low rotational speeds occur when the crankshaft is running down just before it comes to a standstill, however. Here, it is just when the position angle is being set while the crankshaft is running down after the engine operation has ended that a particularly precise operation of the electric motor 4 is required in order to set the starting angle.

The control unit 5 is therefore designed in such a way as to operate the electric motor 4 below a rotational speed limit in an open loop control mode while the internal combustion engine is running down. This means that the electric motor 4 is no longer operated using field-oriented regulation, which takes into account the current rotor speed when generating the drive signals, but is now operated independently of the current rotational speed with specified values such as the drive frequency, and specified current and voltage curves, in order to turn the crank angle slightly further to the starting angle with a torque determined by these values. A signal flank from the position sensor 7 can indicate that the starting angle has been reached. The control unit 5 then immediately stops driving the electric motor 4.

The control unit 5 therefore drives the electric motor 4 below the rotational speed limit in an open loop control mode in order to set the starting angle. The rotational speed limit is set at a rotational speed at which standard rotational speed detection is no longer precise enough to enable the electric motor to be operated using field-oriented regulation without problems arising. This rotational speed limit can be between 5 and 50 RPM, for example, but may also be below or above this value. The current or voltage and frequency are selected so as to ensure that the torque that is reached is sufficient to prevent the internal combustion engine from reversing. This enables position/rotational speed sensors which do not recognize left/right rotation to determine the precise position of the internal combustion engine.

For the standard rotational speed sensors commonly used in engine systems, or when position sensors are used, the direction of rotation is not detected, since the internal combustion engine is only operated in one rotational direction. For this reason, it is necessary for the control unit 5 to drive the electric motor 4 in the open loop control mode in such a way that the crankshaft 2 continues to be turned in the usual direction of rotation of the crankshaft, in order to set the starting angle. The current or voltage and frequency are selected so as to ensure that the torque that is reached is sufficient to prevent the internal combustion engine from reversing. This has the advantage of also enabling position/rotational speed sensors which do not recognize left/right rotation to determine the precise position of the internal combustion engine.

When the internal combustion engine is stopped, the control unit 5 drives the internal combustion engine 1 in such a way that the fuel supply to the internal combustion engine is shut down below an additional rotational speed limit which is larger than the rotational speed limit. The rotational speed limit should preferably be within a range below which no independent engine operation of the internal combustion engine 1, and no rotating engine operation, is possible. The additional rotational speed limit in particular is approx. 800 RPM, but can also have higher or lower values. Furthermore, the electric motor 4 can continue to be driven dependent on the rotational speed with field-oriented regulation below the additional rotational speed limit according to the closed loop control mode, in order to cushion against vibrations of the crankshaft which occur when the internal combustion engine is stopped. For this purpose, the running down of the crankshaft 2 is controlled with the aid of the electric motor 4, i.e. the electric motor 4 limits the vibrations emitted when the rotational speed is reduced while the internal combustion engine 1 is running down by means of an additional torque.

When the rotational speed falls below the rotational speed limit, a switch is made from field-oriented regulation in the closed loop control mode to open loop control of the open loop control mode, in order to set the starting angle to the highest possible degree of precision at the end of the running down procedure. The electric motor 4 is driven in such a way that it sets the starting angle with a prespecified torque, i.e. a prespecified rotational speed, or with a prespecified torque progression.

The "optimum" position angle for starting an internal combustion engine—in other words, the starting angle—depends on different factors, such as the engine type, number of cylinders, firing sequence etc., as well as on the desired starting behaviour, for example whether a low starting torque at the beginning of the starting procedure for the subsequent start, a reduced starting period, or at least a reproducible starting procedure with consistently uniform starting conditions are required. For a four-cylinder, four-stroke internal combustion engine 1 such as the one shown in FIG. 1, a potentially suitable starting angle with reduced starting torque may be within a range immediately after the upper dead center position of the cylinder first fired, for example. Since in a four-cylinder straight sequence engine, the two outer cylinders usually run synchronously with each other, but are operated in reverse rotation to the two inner cylinders, a potentially suitable starting angle may in this case be immediately after the upper dead center position of the two external cylinders of the internal combustion engine 1.

The advantage of this set starting angle is that at the beginning of the subsequent starting procedure, the initial break away torque to be reached by the starter machine 4 is significantly lower than with commonly used starter systems. If the internal combustion engine 1 is started from this set crank angle position, the electric machine 4 is countered by a relatively low, predominantly friction related torque by at least the two external cylinders of the internal combustion engine. Up to the following compression stroke (of the two inner cylinders), the electric motor 4 is able to supply the system with sufficient (starting) power to surmount the compression.

Alternatively, a suitable starting angle may be shortly before the inner dead center position when the main aim is to achieve a reproducible starting behaviour with consistently uniform starting conditions, since this starting angle position is more stable against any vehicle movements which may arise between the point in time when the internal combustion engine is switched off and the subsequent starting procedure.

Figure 2:
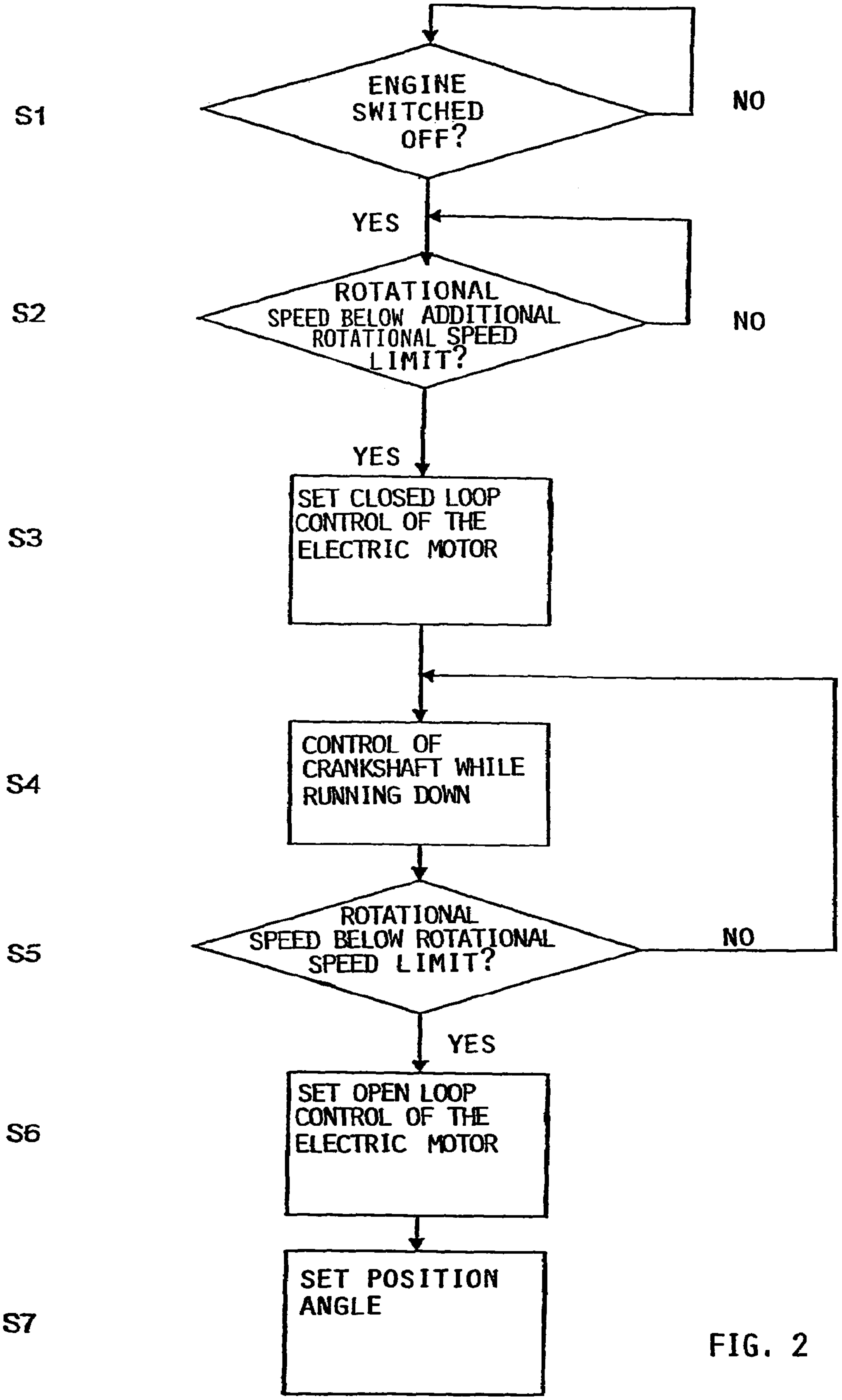
FIG. 2 shows a flow chart of a preferred embodiment.

The flow chart in FIG. 2 shows an embodiment of the inventive method for positioning the crankshaft at a starting angle. In step S1, a query is first issued as to whether the internal combustion engine 1 should be switched off. The user of the vehicle can switch off the engine by turning off the ignition or by another similar procedure. The control unit stops the supply of fuel to the internal combustion engine, and the crankshaft rotational speed is reduced.

If the current rotational speed of the crankshaft 2 falls below the additional rotational speed limit (step S2), then the closed loop control for the electric motor 4 is set or put into operation (step S3). The electric motor 4, driven by the control unit 5, then guides the crankshaft 2 (step S4) in order to cushion against or damp any vibrations which occur when the internal combustion engine 1 runs down. The electric motor is thereby operated using field-oriented regulation, and can therefore be optimally driven by the drive unit 6. If the rotational speed falls below the rotational speed limit (step S5), the value of which indicates that the detection of the rotational speed is now too imprecise to operate the electric motor in the closed loop control, then a switch is made in step S6 to the open loop control of the electric motor 4. In the open loop control, the starting angle can then be set.

What is claimed is:

1. A method for positioning a crankshaft (2) of an internal combustion engine (1) at a starting angle with the aid of an electric motor (4) connected to the crankshaft (2), wherein:

said electric motor (4) can, according to a closed loop control mode, be driven dependent on the rotational speed of the crankshaft (2), after the internal combustion engine (1) is stopped, the crankshaft (2) is positioned at said starting angle, so that, in the case of a subsequent start, the internal combustion engine (1) is started from this starting angle, characterized in that below a rotational speed limit the electric motor (4) is driven in an open loop control mode independently of the rotational speed in order to set the starting angle.

2. A method according to claim 1, characterized in that, when the internal combustion engine (1) is stopped and the rotational speed falls below the rotational speed limit, there is a switch over from field-oriented regulation of said closed loop control mode to the open loop control of said open loop control mode.

3. A method according to claim 1, characterized in that, when the internal combustion engine (1) is to be stopped, the fuel supply to the internal combustion engine (1) is switched off, and when the rotational speed of the internal combustion engine falls below an additional rotational speed limit which is greater than the rotational speed limit, the electric motor (4) is driven according to said closed loop control mode by means of a field-oriented regulation dependent on the rotational speed in order to damp vibrations of the crankshaft (2) when the internal combustion engine is stopped.

4. A method according to claim 1, characterized in that in said open loop control mode the electric motor (4) is driven so as to move the crankshaft (2) to the starting angle with a defined constant or variable torque.

5. A method according to claim 4, characterized in that for the purpose of setting said defined torque the electric motor (4) is driven by means of a drive frequency as well as by means of a voltage or a current.

6. A method according to claim 1, characterized in that an edge of a rotational speed sensor or an edge of a position sensor indicates that the starting angle has been reached.

7. A method according to claim 1, characterized in that a CAN signal indicates that said starting angle has been reached.

8. A method according to claim 1, characterized in that the crank angle reducing the starting time of the internal combustion engine is selected as the starting angle.

9. A method according to claim 1, characterized in that the crank angle reducing the starting torque is selected as said starting angle.

10. A method according to claim 1, characterized in that a crank angle just before the inner dead center position of a cylinder is selected as said starting angle.

11. A control system for driving an electric motor (4) connected to a crankshaft (2) of an internal combustion engine, in order to position the crankshaft (2) at a starting angle, wherein said control system comprises:

a detection device (7) for receiving and/or determining a position angle and/or the rotational speed of the crankshaft (2); and a control unit (5) which is capable of driving the electric motor (4), in a closed loop control mode, dependent on the rotational speed of said crankshaft and of positioning the crankshaft (2) at said starting angle after the internal combustion engine (1) is stopped, so that, in the case of a subsequent start, the internal combustion engine (1) is started from this starting angle, characterized in that said control unit (5) is designed so as to drive the electric motor (4), according to an open loop control mode, below a prespecified rotational speed limit independently of the rotational speed in an open loop control, so that the crankshaft (2) is set to the starting angle.

12. A control system according to claim 11, characterized in that, when the internal combustion engine (1) is stopped and the rotational speed falls below the rotational speed limit, said control unit (5) switches from field-oriented regulation of the closed loop control mode to the open loop control of the open loop control mode.

13. A control system according to claim 12, characterized in that said control unit (5) is further so designed that, when the internal combustion engine (1) is stopped and the rotational speed falls below an additional rotational speed limit which is greater than the rotational speed limit, it shuts down the fuel supply to said internal combustion engine (1) and drives said electric motor (4) according to said closed loop control mode by means of field-oriented regulation dependent on the rotational speed in order to cushion against vibrations of the crankshaft (2) when said internal combustion engine (1) is stopped.

14. A control system according to claim 11, characterized in that the control system includes said electric motor (4), wherein said electric motor comprises an asynchronous motor, a synchronous motor and/or a brush less direct current motor.

15. A control system according to claim 11, characterized in that the control unit is designed so as to drive the electric motor in the open loop control mode with a prespecified torque in order to move the crankshaft to the starting angle, wherein the torque is adjustable by means of a drive frequency as well as by means of a voltage or a current.

* * * * *

UNITED STATES PATENT AND TRADEMARK OFFICE

CERTIFICATE OF CORRECTION

PATENT NO. : 7,261,076 B2
APPLICATION NO. : 11/107406
DATED : August 28, 2007
INVENTOR(S) : Hoevermann It is certified that error appears in the above-identified patent and that said Letters Patent is hereby corrected as shown below:

Column 1,
Line 38, after “to be”, replace “summoned” by --surmounted--;

Column 5,
Line 62, before “torque”, replace “break away” by --breakaway--;

Column 6,
Line 29, after “unit 6.”, insert a paragraph break;

Column 7,
Line 37, after “angle,”, insert a paragraph break;

Column 8,
Line 28, after “and/or a”, replace “brush less” by --brushless--.

Signed and Sealed this

Twenty-fourth Day of March, 2009

JOHN DOLL
*Acting Director of the United States Patent and Trademark Office*